United States Patent
Sitter et al.

(10) Patent No.: US 11,907,447 B2
(45) Date of Patent: Feb. 20, 2024

(54) POLYMERIC FILM HAVING STRUCTURED SURFACE

(71) Applicant: 3M INNOVATIVE PROPERTIES COMPANY, St. Paul, MN (US)

(72) Inventors: Brett J. Sitter, Marine on St Croix, MN (US); Dawn V. Muyres, Stillwater, MN (US); Jonathan T. Kahl, Woodbury, MN (US); Vivian W. Jones, Woodbury, MN (US); Owen M. Anderson, Minneapolis, MN (US); Gordan A. Kuhnley, St. Paul, MN (US); Joshua J. Loga, River Falls, WI (US); Erin A. McDowell, Afton, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 166 days.

(21) Appl. No.: 17/297,498

(22) PCT Filed: Dec. 6, 2019

(86) PCT No.: PCT/IB2019/060528
§ 371 (c)(1),
(2) Date: May 27, 2021

(87) PCT Pub. No.: WO2020/128707
PCT Pub. Date: Jun. 25, 2020

(65) Prior Publication Data
US 2022/0035464 A1   Feb. 3, 2022

Related U.S. Application Data

(60) Provisional application No. 62/781,150, filed on Dec. 18, 2018.

(51) Int. Cl.
*G06F 3/0354* (2013.01)
*B29C 33/38* (2006.01)
(Continued)

(52) U.S. Cl.
CPC ...... *G06F 3/03545* (2013.01); *B29C 33/3842* (2013.01); *B29C 39/026* (2013.01); *B32B 3/30* (2013.01); *B29L 2031/3475* (2013.01)

(58) Field of Classification Search
CPC ............... B32B 3/30; Y10T 428/24479; G06F 3/03545; B29C 33/3842; B29C 39/026; B29L 2031/3475
(Continued)

(56) References Cited

U.S. PATENT DOCUMENTS 5,175,030 A    12/1992   Lu
5,183,597 A    2/1993    Lu
(Continued)

FOREIGN PATENT DOCUMENTS

WO    WO 2017-139611    8/2017
WO    WO 2018-125624    7/2018

OTHER PUBLICATIONS

International Search Report for PCT International Application No. PCT/IB2019/060528, dated Apr. 29, 2020, 4 pages.

*Primary Examiner* — Catherine A. Simone
(74) *Attorney, Agent, or Firm* — Clifton F. Richardson

(57) ABSTRACT

A polymeric film including a major surface having a plurality of intersecting extended structures is described. For at least a majority of the structures in the plurality of extended structures: each structure extends along a length of the structure, has an average width along a direction transverse to the length and generally along the first major surface, and has an average height along a direction generally perpendicular to the first major surface; and the average width of
(Continued)

the structure may be in a range of 1 to 200 micrometers, the average height of the structure may be in a range of 1 to 200 micrometers, and the length may be at least 3 times the average width. The extended structures may be randomly or pseudorandomly oriented and may be formed by microreplicating a surface of a paper.

16 Claims, 9 Drawing Sheets

(51) Int. Cl.
    *B29C 39/02*     (2006.01)
    *B32B 3/30*     (2006.01)
    *B29L 31/34*     (2006.01)

(58) Field of Classification Search
    USPC .......................................................... 428/156
    See application file for complete search history.

(56) References Cited

U.S. PATENT DOCUMENTS

| | | |
|---|---|---|
| 6,203,885 B1 | 3/2001 | Sher |
| 6,322,236 B1 | 11/2001 | Campbell |
| 7,328,638 B2 | 2/2008 | Gardiner |
| 7,350,442 B2 | 4/2008 | Ehnes |
| 2006/0132945 A1 | 6/2006 | Sano |
| 2008/0032096 A1 | 2/2008 | Bourdelais |
| 2012/0064296 A1 | 3/2012 | Walker, Jr. |
| 2012/0070622 A1 | 3/2012 | Stocq |
| 2015/0291828 A1 | 10/2015 | Yokoyama |
| 2016/0010279 A1 | 1/2016 | Hu |
| 2016/0016338 A1 | 1/2016 | Radcliffe |
| 2017/0115498 A1 | 4/2017 | Sitter |
| 2017/0131559 A1 | 5/2017 | Sitter |
| 2017/0139500 A1 | 5/2017 | Large |

POLYMERIC FILM HAVING STRUCTURED SURFACE

CROSS REFERENCE TO RELATED APPLICATIONS

This application is a national stage filing under 35 U.S.C. 371 of PCT/IB2019/060528, filed Dec. 6, 2019, which claims the benefit of provisional Application No. 62/781,150, filed Dec. 18, 2018, the disclosures of which are incorporated by reference in their entirety herein.

BACKGROUND

Electronic displays may be configured to digitally record contact positions of a stylus with the display so that a user can write on the display with the stylus.

SUMMARY

In some aspects of the present description, a polymeric film including a microreplicated first major surface is provided. The first major surface includes a plurality of randomly or pseudorandomly oriented intersecting extended structures. For at least a majority of the structures in the plurality of extended structures: each structure extends along a length of the structure, has an average width along a direction transverse to the length and generally along the first major surface, and has an average height along a direction generally perpendicular to the first major surface; and the average width of the structure is in a range of 1 to 200 micrometers, the average height of the structure is in a range of 1 to 200 micrometers, and the length is at least 3 times the average width.

In some aspects of the present description, a polymeric film including a unitary layer having a structured first major surface including a plurality of randomly or pseudo-randomly oriented intersecting extended structures protruding outwardly from the polymeric film is provided. For at least a majority of the structures in the plurality of extended structures: each structure extends along a length of the structure, has an average width along a direction transverse to the length and generally along the first major surface, and has an average height along a direction generally perpendicular to the first major surface; and the average width of the structure is in a range of 1 to 200 micrometers, the average height of the structure is in a range of 1 to 200 micrometers, and the length is at least 3 times the average width.

In some aspects of the present description, a polymeric film having a microreplicated first major surface is provided. The first major surface includes a plurality of randomly or pseudorandomly oriented intersecting extended structures. For at least a majority of the structures in the plurality of extended structures: each structure extends along a length of the structure and has a largest lateral dimension orthogonal to the length, the length being at least 3 times the largest lateral dimension.

In some aspects of the present description, a method of making a polymeric film is provided. The method includes: forming a first mold by coating a template layer with an impression material, at least partially curing the impression material, removing the template layer from the at least partially cured impression material to provide the first mold having a structured surface; and casting and curing a resin against the structured surface of the first mold or against a structured surface of a second mold formed from the first mold. The template layer is a paper or a canvas.

In some aspects of the present description, a display including a polymeric film disposed on an output surface of the display is provided. The polymeric film has a first major surface including a plurality of intersecting randomly or pseudorandomly oriented extended structures. For at least a majority of the structures in the plurality of intersecting extended structures: each structure extends along a length of the structure and has a largest lateral dimension orthogonal to the length, the length being at least 3 times the largest lateral dimension. The plurality of extended structures covers at least 10%, or at least 20%, or at least 30%, or at least 40%, or at least 50% of a total area first major surface.

In some aspects of the present description, a display including a polymeric film disposed on an output surface of the display is provided. The display is configured to be electronically writable with a stylus. The polymeric film has a first major surface formed by microreplicating a surface of a paper or a canvas and is configured to provide a haptic response through the stylus. The first major surface includes a plurality of intersecting extended structures. For at least a majority of the structures in the plurality of intersecting extended structures: each structure extends along a length of the structure and has a largest lateral dimension orthogonal to the length, the length being at least 3 times the largest lateral dimension. The plurality of extended structures covers at least 10%, or at least 20%, or at least 30%, or at least 40%, or at least 50% of a total area first major surface.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Handwriting is a complex cognitive process relying on intricate perceptual-sensorimotor combinations. For example, handwriting often utilizes many coordinated skills or activities such as visual perceptual skills, visual motor skills, muscle memory, eye-hand coordination, bilateral coordination, fine motor skills, in-hand manipulation, body posture, and letter formation. In studies of writing, the role of the physically tangible writing device (pen on paper, digital stylus pen and tablet, keyboard and mouse) is rarely addressed, but "embodied cognition" theories suggest that perception and motor action are closely connected and reciprocally dependent. However, writing surfaces used for currently available electronically writable digital displays (e.g., writable with a stylus whose contact positions with the display is digitally recorded by the display), do not have a surface texture that accurately reproduces the haptic response from writing on paper. An object of some embodiments of the present description is to provide a film that can be placed on the font side of a display to provide a paper-like haptic writing user experience, a durable surface, and minimal unwanted optical effects.

Traditional approaches to providing an improved haptic response include modifying a structured surface of an anti-glare film, for example, to provide an altered haptic response. However, the surface topography of a conventional anti-glare film is very different from that of a typical paper and it has been found to be difficult to provide a suitable haptic response from modifying such films. According to some embodiments of the present description, polymeric films are provided which include a plurality of intersecting extended structures which may be randomly or pseudorandomly oriented. It has been found that such polymeric films can provide a desired paper-like haptic response while having a sufficiently low haze and sufficiently high transparency that the film is suitable for placing on a viewable surface of a display.

Figure 8:
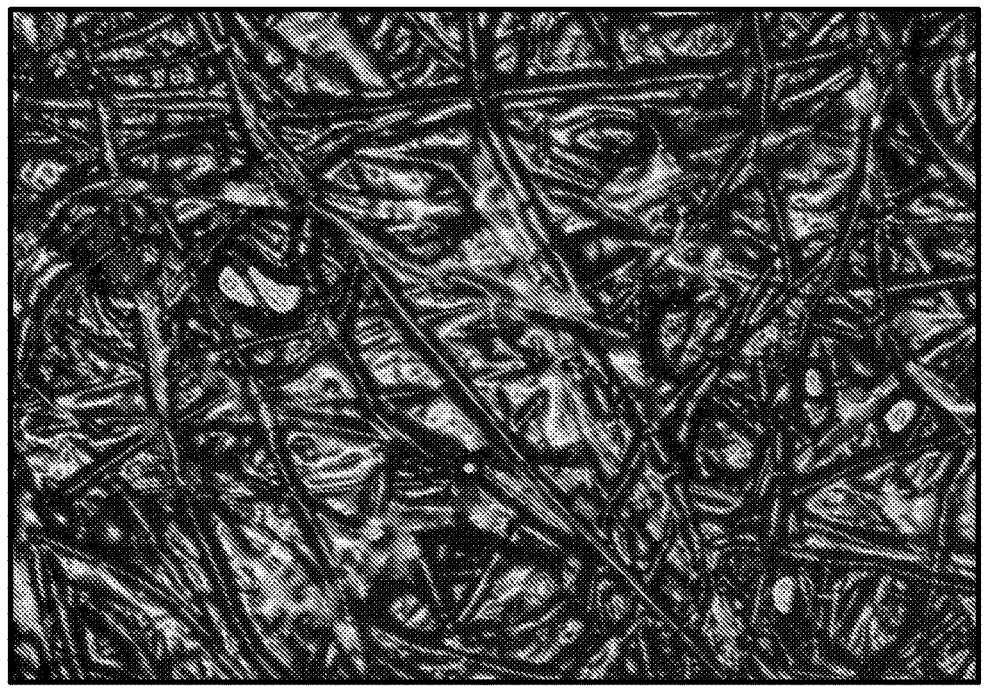
FIG. 8 is an image of a structured surface of a polymeric film.
Figure 9:
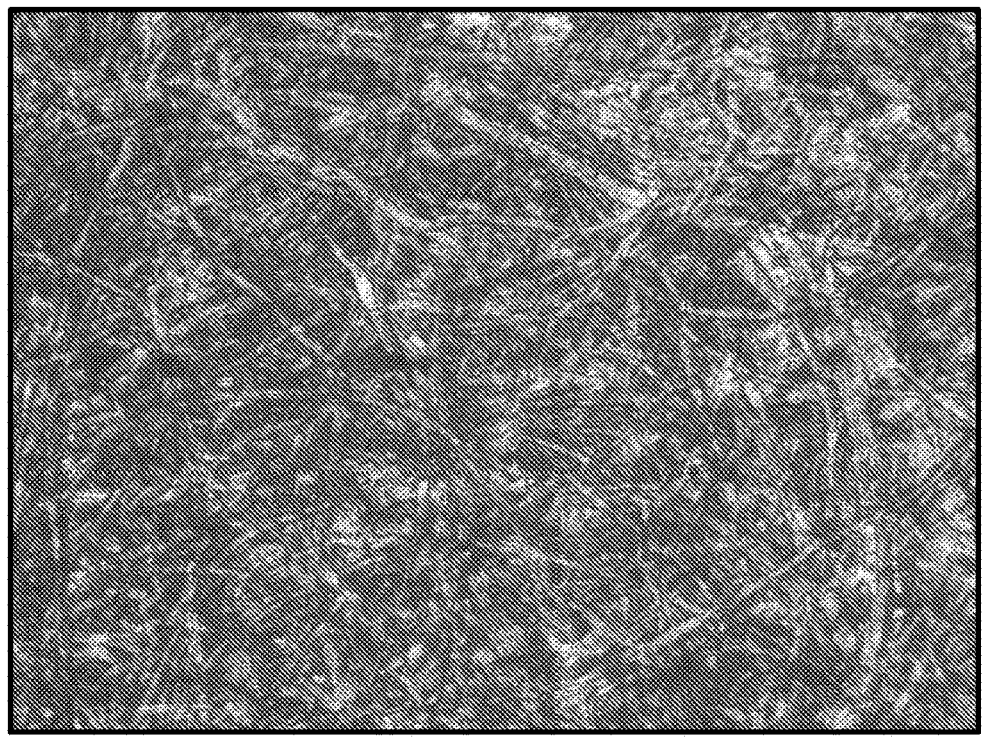
FIG. 9 is an image of a structured surface of another polymeric film.

In some embodiments, the structured surface may be formed by microreplicating a paper surface, for example, or another suitable writing surface (e.g., a canvas), to provide a microreplication tool which is used to form the structures. In some embodiments, a pattern of extended structures may be designed (e.g., on a computer) to mimic a paper surface or a negative image of a paper surface, for example, and the pattern is formed onto a microreplication tool which is then used to make the structured surfaces. The tool may be fabricated using any available fabrication method, such as by replicating a paper surface or by using engraving or diamond turning. Exemplary diamond turning systems and methods can include and utilize a fast tool servo (FTS) as described in, for example, U.S. Pat. No. 7,350,442 (Ehnes et al.), U.S. Pat. No. 7,328,638 (Gardiner et al.), and U.S. Pat. No. 6,322,236 (Campbell et al.). In some embodiments, the structured surface is formed in a cast and cure process. For example, the structures may be fabricated using microreplication from a tool by casting and curing a polymerizable resin (e.g., ultraviolet (UV)-curable) composition in contact with a tool surface such as described in U.S. Pat. No. 5,175,030 (Lu et al.), U.S. Pat. No. 5,183,597 (Lu), and U.S. Pat. App. Pub. No. 2012/0064296 (Walker, J R. et al.). Illustrative images of structured surfaces of polymeric films formed by microreplicating a surface of paper are provided in FIGS. 8-9.

Randomly oriented extended structures on a structured major surface refer to structures extending generally along the major surface where the directions along the major surface that the structures extend are substantially uniformly randomly oriented. Substantially uniformly randomly oriented includes, for example, orientations that are uniformly randomly distributed, or nominally uniformly randomly distributed, or randomly distributed with some degree of bias along one or more directions but not biased to such a degree that orientations along any direction along the major surface would be excluded. For example, fibers in a paper are typically randomly oriented, while prisms in a prism film which extend predominantly in one direction are not randomly oriented even if there is some degree of noise or randomness of the orientation direction about the predominate direction. The orientation of fibers in a paper may be uniformly randomly distributed or may be randomly distributed with a bias along a machine direction (direction along the length of a roll of paper in a paper manufacturing process) or along a direction transvers to the machine direction, or along directions approximately halfway between the machine and transverse directions, for example. Random distributions of orientation are described further elsewhere herein.

Pseudorandomly oriented extended structures are structures that appear to be randomly oriented, but are derived from, at least in part, a deterministic process. For example, randomly oriented extended structures can be used to make a tool which reproduces the randomly oriented extended structures (or a negative image of the randomly oriented extended structures) locally, but which periodically repeats the locally random pattern. The orientations of such pseudorandomly oriented extended structures may be described as being disordered locally but having a degree of long-range order. As another example of pseudorandomly oriented extended structures, the structures may be generated from a computer algorithm to mimic randomly oriented extended structures. Since the pattern of the structures result from a deterministic algorithm in this case, the structures can be described as pseudorandomly oriented. Such computer-generated patterns may also repeat a locally disordered pattern so that there is a degree of long-range order.

Figure 1:
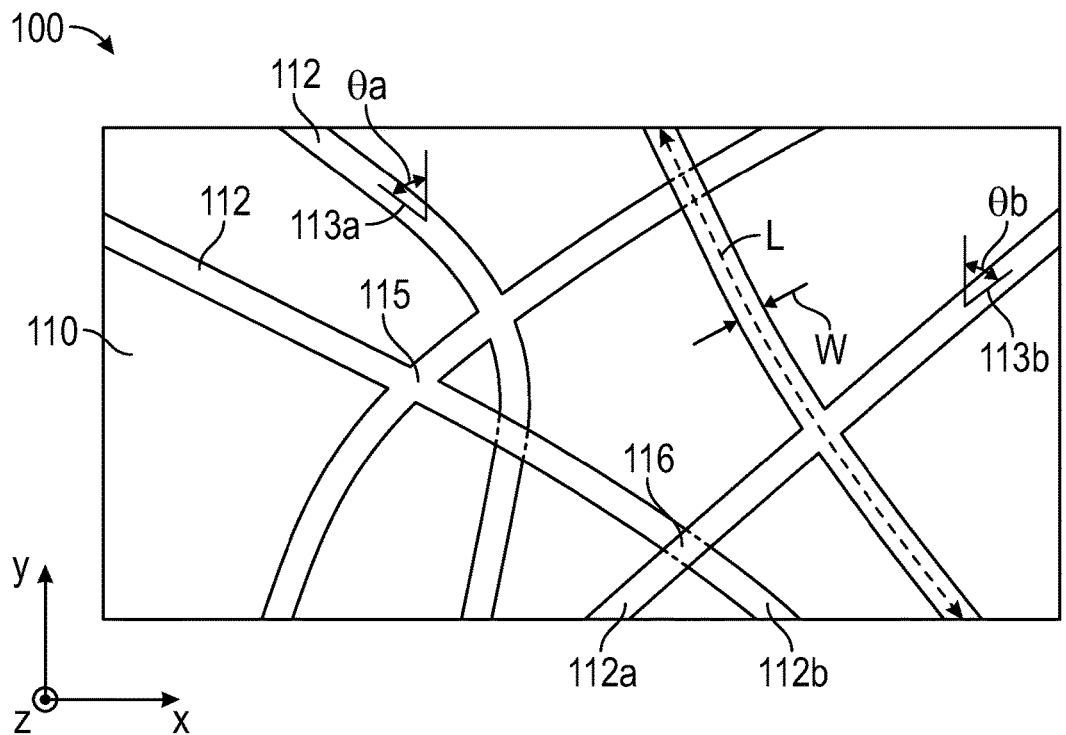
FIG. 1 is a schematic top view of a structured major surface of a polymeric film.

FIG. 1 is a schematic top view of a structured first major surface 110 of a polymeric film 100. The first major surface 110 includes a plurality of randomly or pseudorandomly oriented intersecting extended structures 112. Such structures can be formed by microreplication as described further elsewhere herein. The areal density of the structures 112 may be different than schematically illustrated in FIG. 1. In some embodiments, the plurality of extended structures 112 covers at least 10%, or 20%, or 30%, or 40%, or 50% of a total area first major surface 110. Each structure extends along a length L of the structure, has an average width W along a direction transverse to the length and generally along the first major surface (e.g., along x-y plane), and has an average height H (see FIGS. 2A-2B) along a direction (e.g., z-direction) generally perpendicular to the first major surface. The height and/or width may vary over the length of the structure. The average width and average height refers to the average of the width and height, respectively, over the length of the structure.

Extended structures may be said to intersect or interpenetrate when the structures contact or penetrate through one another at an intersection of the structures. In some cases, the structures merge together at the intersection locations. For example, the structures intersecting at intersection 115 merge together at the intersection 115. In some cases, the structures at an intersection have different heights so that it appears in a top plan view that one structure passes over the other structure. For example, in a top plan view, the structure 112a appears to pass over the structure 112b at the intersection 116. However, a lower portion of structure 112a may merge with a lower portion of 112b at the intersection 116.

Figure 2A:
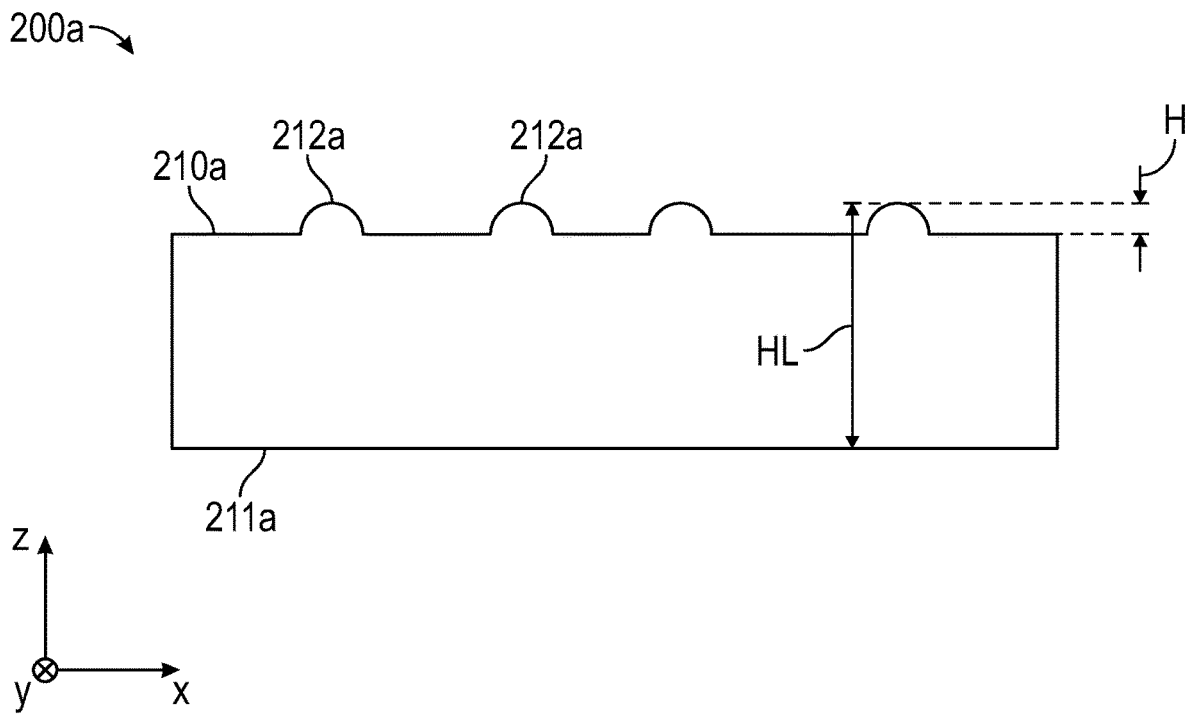
FIG. 2A is a schematic cross-sectional view of a polymeric film having a structured major surface including extended structures which protrude outward from the polymeric film.

The structures 112 may protrude outwardly from the polymeric film or may be recessed into the polymeric film. FIG. 2A is a schematic illustration of a cross-section through a polymeric film 200a having a structured first major surface 210a including extended (into the page in the schematic illustration of FIG. 2A) structures 212a which protrude outward from the polymeric film 200a. The structures 212a may be more, or less, densely arranged and/or may be more, or less, irregularly arranged and/or may have different size and/or shape than schematically illustrated in FIG. 2A. The structures 212a have an average height H which is the average of the height the structures 212a protrude from an average height of portions of the first major surface 210a not including the structures 212a.

Figure 2B:
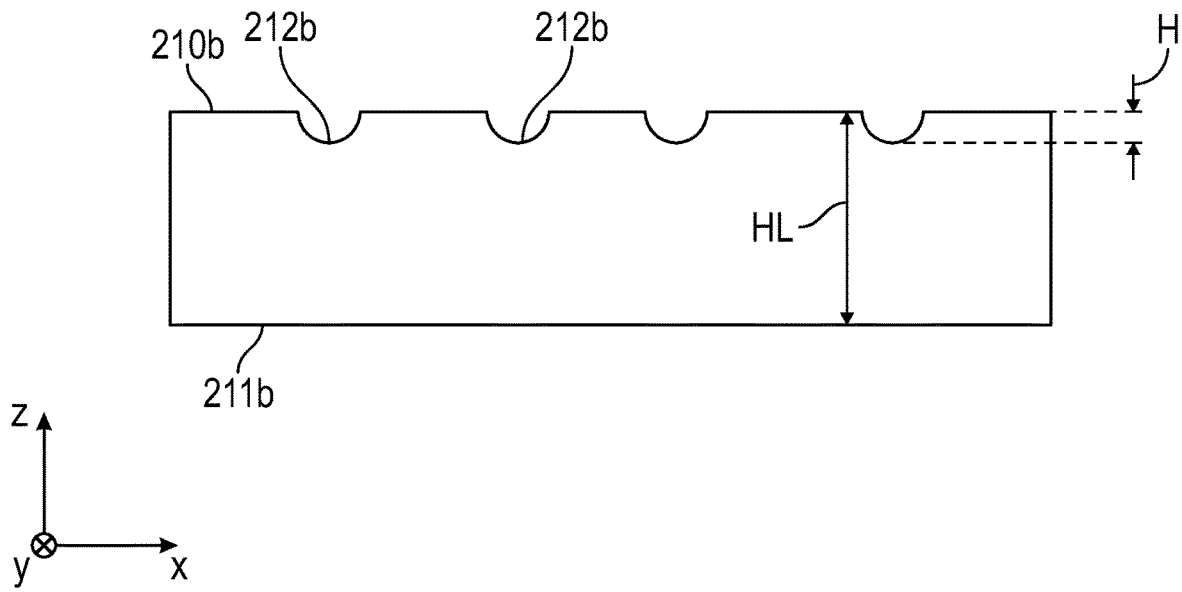
FIG. 2B is a schematic cross-sectional view of a polymeric film having a structured major surface including extended structures which are recessed into the polymeric film.

FIG. 2B is a schematic illustration of a cross-section through a polymeric film 200b having a structured first major surface 210b including extended (into the page in the schematic illustration of FIG. 2B) structures 212b which are recessed into the polymeric film 200b. The structures 212b may be more, or less, densely arranged and/or may be more, or less, irregularly arranged and/or may have different size and/or shape than schematically illustrated in FIG. 2B. The structures 212b have an average height H which is the average of the height that the structures 212b are recessed in from an average height of portions of the first major surface 210b not including the structures 212b.

Figure 2C:
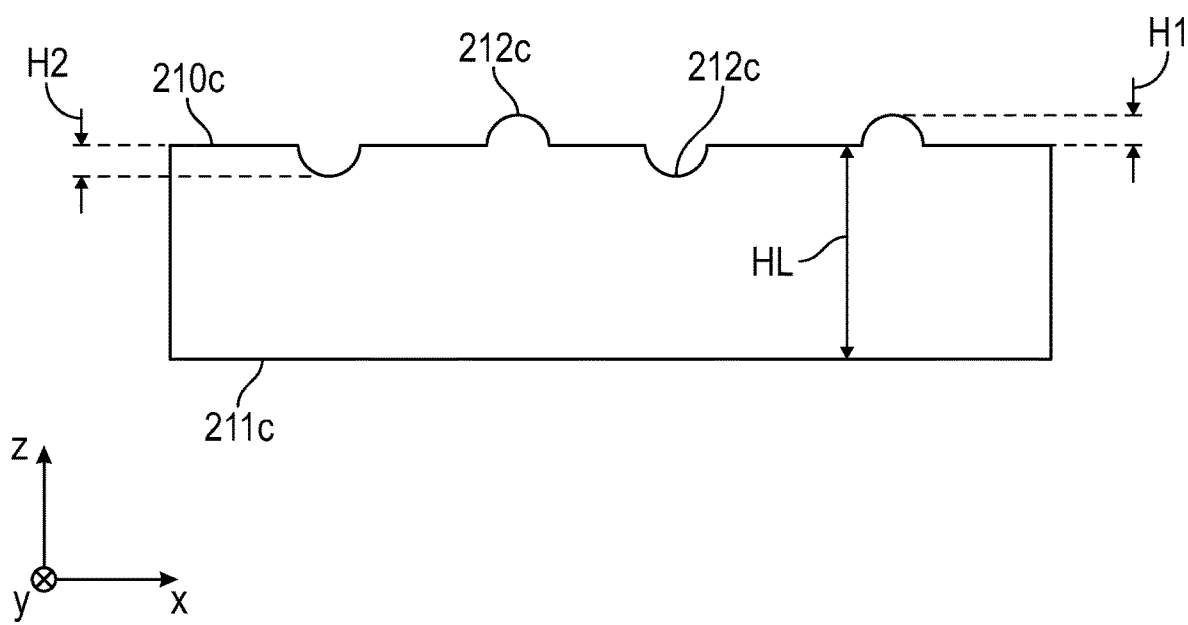
FIG. 2C is a schematic cross-sectional view of a polymeric film having a structured major surface including extended structures protruding outward from the polymeric film and extended structures recessed into the polymeric film.

FIG. 2C is a schematic illustration of a cross-section through a polymeric film 200c having a structured first major surface 210c including extended (into the page in the schematic illustration of FIG. 2C) structures 212c some of which protrude outward from the polymeric film 200c and some of which are recessed into the polymeric film 200c. A height H1 of a protruding structure and a height H2 of a recessed structure are indicated. In some embodiments, average heights of the protruding structures and average heights of the recessed structures are equal or about equal (e.g., equal to within ±10% or to within ±5%). The average over each of the structures (considered to be positive for protruding and recessed structures) is the average height H which may be in any of the ranges described herein.

The polymeric films 200a, 200b, and 200c also have a second major surface 211a, 211b, and 211c, respectively, opposite the first major surface. The second major surface 211a, 211b, or 211c may be structured or unstructured. In some embodiments, the second major surface 211a, 211b, or 211c is optically smooth. In some embodiments, the polymeric film 200a, 200b, or 200c, which may be a unitary layer, has a thickness HL greater than a maximum height of the plurality of extended structures 212a, 212b, or 212c, respectively. The maximum height of the structures 212a or 212b may be the height H illustrated in FIG. 2A or 2B, respectively, and the maximum height of the structures 212c may be either of the heights H1 and H2 illustrated in FIG. 2C, for example.

In some embodiments, the first major surface 210a or 210b or 210c is a microreplicated surface, which is a structured surface that is formed by, or is equivalent to a surface formed by, microreplication from a tool having tool structures having a suitable geometry for creating the desired structured surface geometry. Microreplicated structures have at least one dimension (e.g., a width) less than 1 mm and greater than 1 nm. Microstructures can have at least two orthogonal dimensions (e.g., a width and a height) less than 1 mm and greater than 100 nm. In some embodiments, the first major surface 210a or 210b is formed by microreplicating a surface of a paper as described further elsewhere herein. Microreplication generally refers to replicating (copying or copying a reverse image) microstructures from a tool (e.g., in a cast and cure process).

In some embodiments, for at least a majority (e.g., greater than 50%, or at least 60%, or at least 70%, or at least 80%, or at least 90%, or all or substantially all) of the structures in the plurality of randomly or pseudorandomly oriented intersecting extended structures: each structure extends along a length L of the structure, has an average width W along a direction transverse to the length and generally along the first major surface, and has an average height H along a direction generally perpendicular to the first major surface; and the average width W of the structure is in a range of 1 to 200 micrometers, the average height of the structure H in a range of 1 to 200 micrometers, and the length L is at least 3 times the average width. In some such embodiments, or in other embodiments, the length L is at least 3 times the average height. In some embodiments, the structure has a largest lateral dimension orthogonal to the length, and the length L is at least 3 times (or at least 5 times, or at least 7 times, or at least 10 times, or at least 15 times, or at least 20 times) the largest lateral dimension. In some embodiments, the width is constant or substantially constant, and the largest lateral dimension is equal to or substantially equal to the average width W. In some embodiments, the average width W is within 20% or within 10% of the largest lateral dimension. In some embodiments, the average width W is in a range of 3 to 100 micrometers, or 5 to 50 micrometers. In some such embodiments or in other embodiments, the average height H is in a range of 3 to 100 micrometers, or 5 to 50 micrometers. The average width W divided by the average height H may be in any suitable range, for example, in a range of 0.02 to 100, or in a range of 0.2 to 10. However, it is typically preferred that the average width W divided by the average height H be in a range of 0.5 to 8, or 0.7 to 6, or 0.8 to 4, or 1 to 4, or 1.5 to 4, or 1 to 3. In some embodiments, the length L is at least 3 times, or at least 5 times, or at least 7 times, or at least 10 times, or at least 15 times, or at least 20 times the average width W. In some such embodiments or in other embodiments, the length L is at least 3 times, or at least 5 times, or at least 7 times, or at least 10 times, or at least 15 times, or at least 20 times the average height H. In some embodiments, each structure in at least the majority of the structures is recessed into the polymeric film (see, e.g., FIG. 2B). In some embodiments, each structure in at least the majority of the structures is free of fibers (e.g., the structures are formed by microreplication, not by including fibers which form the structure).

In some embodiments, at least a majority (e.g., the same majority having the L, W and H described above) of the structures has a substantially hemispheric shape in a transverse cross-section as schematically illustrated in FIGS. 2A-2C. A substantially hemispheric shape is a curved shape extending from a base (e.g., adjacent portions of the first major surface not including an extended structure) to a height of the shape where the shape has a curvature that does not change signs and the height is approximately half of a width of the shape (e.g., a height of 0.3 to 0.7 times the width, or 0.4 to 0.6 times the width). In some embodiments, the curved shape has a radius of curvature that varies (maximum minus minimum divided by maximum times 100 percent) by no more than 50%, or no more than 40%, or no more than 30%, or no more than 20%, for example. In some embodiments, each structure in at least the majority of the structures protrudes outwardly from the polymeric film (see, e.g., FIG. 2A). In some embodiments, each structure in at least the majority of the structures is recessed into the polymeric film (see, e.g., FIG. 2B). In some embodiments, a first plurality of structures in the at least the majority of the structures protrudes outwardly from the polymeric film and a second plurality of structures in the at least the majority of the structures is recessed into the polymeric film (see, e.g., FIG. 2C).

The polymeric films of the present description may be configured for use in display applications. In some embodiments, the polymeric film has an optical haze of no more than 50%, or no more than 40%, or no more than 30%. In some embodiments, the polymeric film has an average transmittance of normally incident visible light of at least 70%, or at least 80%, or at least 85%. The optical haze and transmittance can be determined according to the ASTM D1003-13 test standard, which is titled "Standard Test Method for Haze and Luminous Transmittance of Transparent Plastics".

Figure 3A:
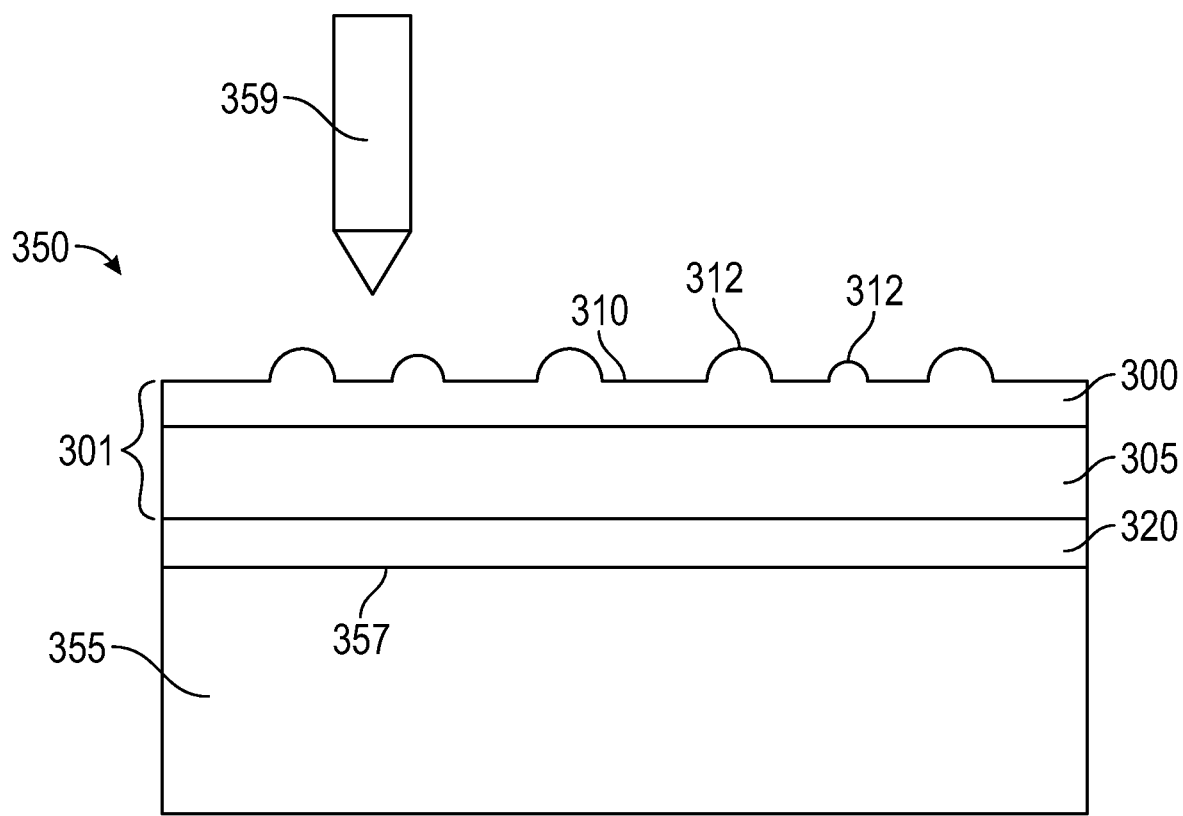
FIG. 3A is a schematic cross-sectional view of a display.

FIG. 3A is a schematic cross-sectional view of a display 350 including a display panel 355 and a polymeric film 301 disposed on an output surface 357 of the display 350. The output surface of the display 350 can be understood to be a surface through which the imaged light output produced by the display is transmitted. This surface can be taken to be the top major surface of the display panel 355 in the illustrated embodiment. The polymeric film 301 has a first major surface 310 including extended structures 312 which may protrude outwardly from the polymeric film 301 as illustrated or which may be recessed into the polymeric film 301. The first major surface 310 faces away from the output surface 357. In the illustrated embodiments, the polymeric film 301 includes a unitary layer 300, which includes the first major surface 310, disposed on a polymeric substrate 305, which may be a polyethylene terephthalate (PET) film or another polymeric film substrate, for example. In the illustrated embodiment, the polymeric film 301 is adhered to the output surface 357 through an adhesive or adhesive layer 320, which may be an optically clear adhesive (e.g., having an optical haze less than 10% or less than 5%, and an average transmittance of normally incident visible light of greater than 80% or greater than 85%).

Figure 3B:
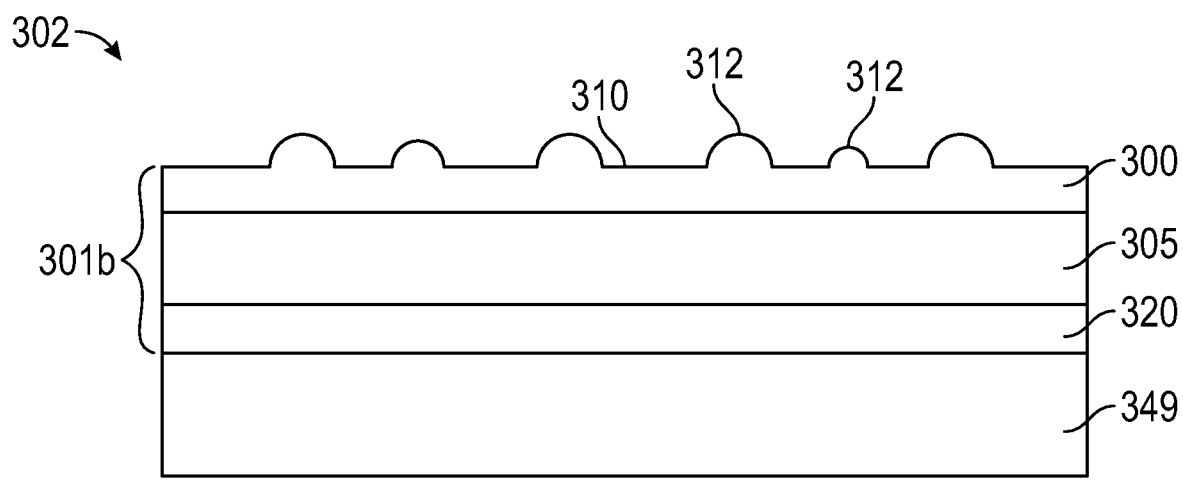
FIG. 3B is a schematic cross-sectional view of a polymeric film.

The polymeric film 301 can alternative be considered to include the adhesive layer 320. FIG. 3B is a schematic cross-sectional view of a film stack 302 including a polymeric film 301b disposed on a release liner 349. The polymeric film 301b includes the polymeric film 301 and the adhesive layer 320 opposite the first major surface 310. The adhesive layer 320 is releasably attached to the release liner 349. The polymeric film 301b can be removed from the release liner 349 and adhered directly do the output surface 357 of the display 350.

In some embodiments, the display 350 is a writable display. In some embodiments, the writable display is configured to sense contact (e.g., electronically via a change in a dielectric response) of a writing article 359 with the first major surface 310 of the polymeric film 301. The writing article 359 may be a stylus or a finger, for example. In some embodiments, the display 350 is configured to be electronically writable with a stylus and the first major surface is configured to provide a haptic response through the stylus (e.g., to a hand of a user writing with the stylus). In some embodiments, the polymeric film 301, or any of the polymeric films of the present description, or any of the unitary layers of the present description, may have a low dielectric constant so that it does not substantially interfere with the display's measurement of the dielectric response resulting from the presences of the writing article 359. In some embodiments, the polymeric film has a dielectric constant of less than 7, or less than 6, or less than 5, or less than 4, or less than 3. The dielectric constant can be determined according to the ASTM D150-18 "Standard Test Methods for AC Loss Characteristics and Permittivity (Dielectric Constant) of Solid Electrical Insulation" test standard, for example. The dielectric constant should be understood to be determined at a frequency of 500 kHz and at a temperature of 23° C. unless specified differently. In some embodiments, the polymeric film includes a unitary layer disposed on a substrate. In such embodiments, the dielectric constant of the polymeric film can be understood to be the volume-weighted average of the dielectric constants of the two layers (the unitary layer and the substrate). In some embodiments, both the unitary layer and the substrate have a dielectric constant at 500 kHz of less than 7, or less than 6, or less than 5, or less than 4, or less than 3. Useful polymeric materials for use in the polymer film include polyethylene terephthalate (PET), polyethylene naphthalate (PEN), polypropylene, polyethylene, and polymethylmethacrylate (PMMA), for example.

Figure 4:
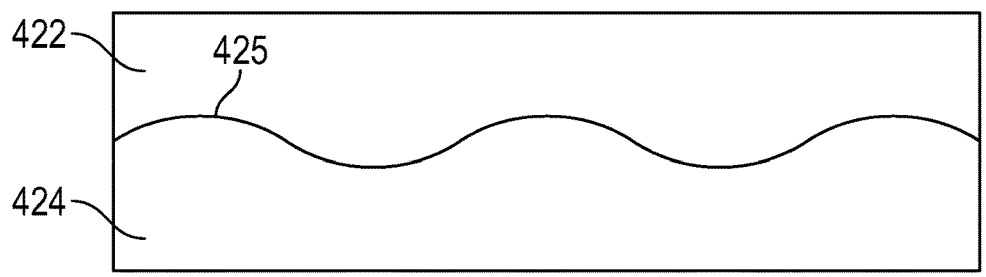
FIG. 4 is a schematic cross-sectional view of an adhesive that includes a structured interface.

In some cases, a film having a structured surface, such as an anti-glare film, induces sparkle when the film is placed on a pixelated display since light from a pixel may appear to move around or flicker as the viewer moves due to the interaction of the pixel light with the structured surface. In some embodiments, a polymeric film of the present description is adhered to a display with an adhesive (e.g., an optically clear adhesive) including a structured interface adapted to reduce sparkle induced by the polymeric film. FIG. 4 is a schematic illustration of an adhesive 420 that includes a structured interface 425 between first and second layers 422 and 424. The first and second layers 422 and 424 may be selected to have different refractive indices (e.g., at a specified wavelength 532 nm or at 633 nm) and the structured interface 425 may be periodic (e.g., in one in-plane direction or in two orthogonal in-plane directions) so that the structured 425 produces a diffraction pattern when light passes through the adhesive 420. In some embodiments, the adhesive is an optical stack including three or more layers and two or more structured interfaces adapted to reduce sparkle. The refractive indices and the geometry of the structured interface can be selected to provide a diffraction pattern which provides light between adjacent pixels and this can reduce sparkle. Using a structured interface to reduce sparkle is described in U.S. Pat. Appl. Publ. Nos. US 2017/0131559 (Sitter et al.), US 2017/0115498 (Sitter et al.), and US 2016/0016338 (Radcliffe et al.), for example.

In some embodiments, a method of making a polymeric film includes forming a first mold by coating a paper, or other suitable template layer (e.g., a canvas or other surface suitable as a drawing or writing surface), with an impression material, at least partially curing the impression material, removing the paper, or other template layer, from the at least partially cured impression material to provide the first mold having a structured surface; and casting and curing a resin against the structured surface of the first mold or against a structured surface of a second mold formed from the first mold. FIGS. 5A-5F and FIGS. 6A-6D schematically illustrate process steps for making a structured surface.

Figure 5A:
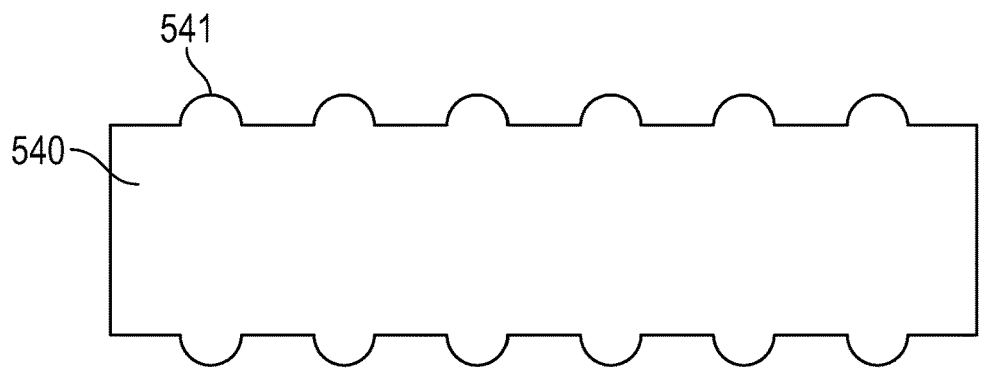
FIG. 5A is a schematic cross-sectional view of a template layer.
Figure 5B:
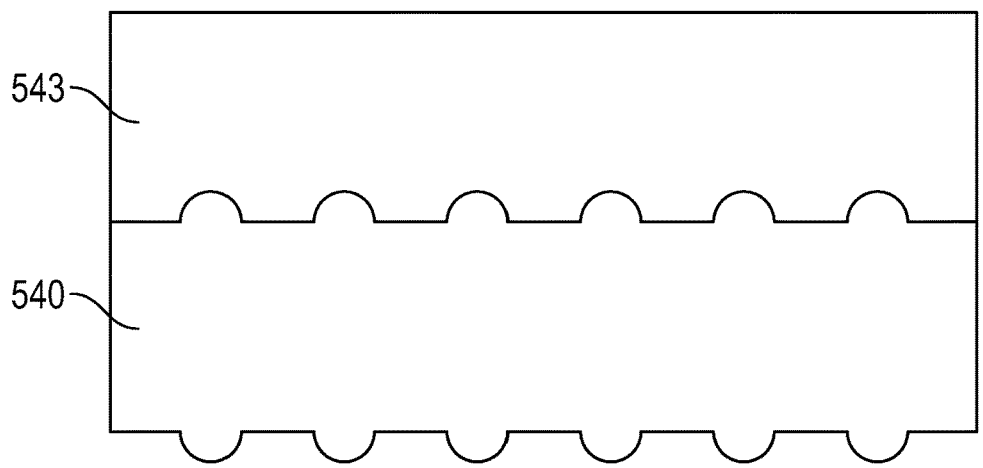
FIG. 5B is a schematic cross-sectional view of the template layer of FIG. 5A coated with an impression material.
Figure 5C:
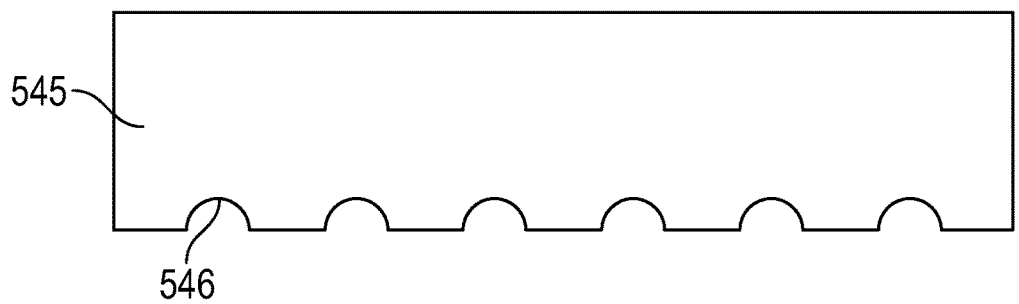
FIG. 5C is a schematic cross-sectional view of a mold.
Figure 5D:
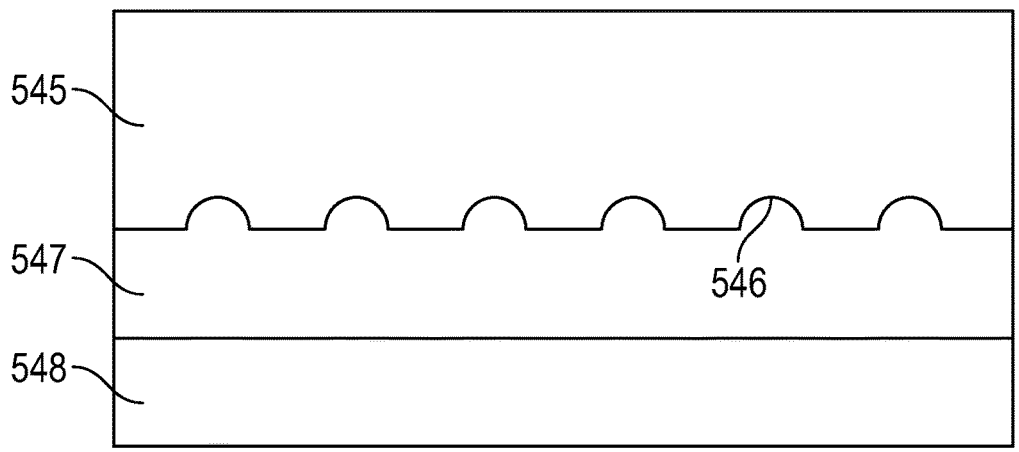
FIG. 5D is a schematic cross-sectional view illustrating a resin supported by a substrate and disposed on the structured surface of the mold of FIG. 5C.
Figure 5E:
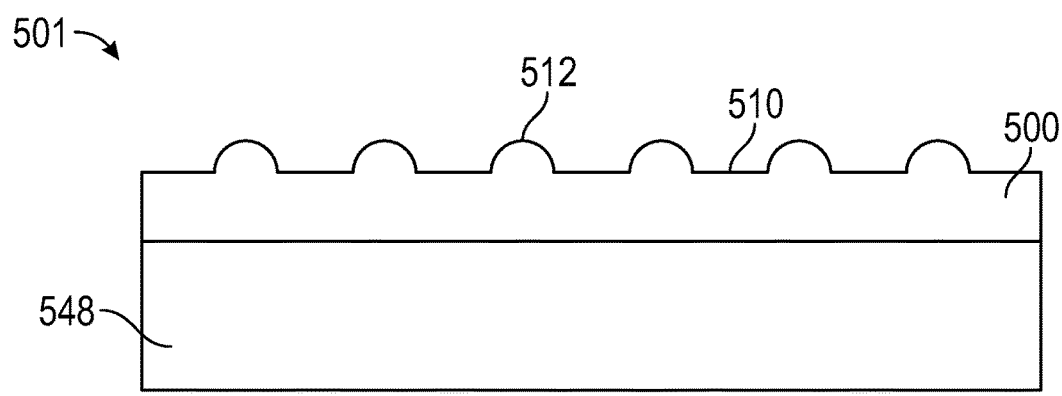
FIG. 5E is a schematic cross-sectional view of a polymeric film having a structured surface formed using the mold of FIG. 5C.

FIG. 5A is a schematic cross-sectional view of a template layer 540, which may be a paper, schematically illustrating fibers (or other structures) 541 providing a surface structure to the layer 540. It will be understood that the layer 540 may be a paper having a substantially different fiber size and/or shape and/or distribution (e.g., degree of randomness) than schematically illustrated in FIG. 5A and/or may have additional fiber structure not shown in the schematic illustration of FIG. 5A. In some embodiments, the template layer 540 is a paper which may be any suitable type of paper such as one or more of bond paper, wood-free paper, tree-free paper, uncoated paper, wood pulp-based paper, cotton pulp-based paper, Bristol paper, vellum Bristol paper, silk paper, textured paper, standard office printer paper, or paper having an areal density between 50 and 350 g/m$^2$. In some embodiments, layer 540 is a canvas such as a painting canvas (e.g., a linen canvas or a cotton duck canvas). A canvas, as used herein, is a woven fabric having a surface suitable for use as a painting or writing surface. In some embodiments, the woven fabric of a canvas may be partially filled with a clay, for example, to improve the paintability or writability of the canvas surface, as is known in the art. FIG. 5B is a schematic illustration of an impression material 543 applied to the template layer 540. FIG. 5C is a schematic illustration of a first mold 545 having a structured surface 546 which is formed by removing the layer 540 from the impression material 543 after it has been at least partially cured. In some embodiments, the impression material 543 is partially cured prior to removing the template layer 540 and then the first mold 545 is fully cured after the layer 540 has been removed. In some embodiments, the impression material 543 is substantially fully cured prior to removing the layer 540. The first mold 545 has a structured surface 546. FIG. 5D is a schematic illustration showing a resin 547 that has been cast against the structured surface 546 of the first mold 545. The resin 547 is supported by substrate 548. Curing the resin 547 and removing the resin and substrate from the first mold 545 results in polymeric film 501 including layer 500 disposed on the substrate 548 as schematically illustrated in FIG. 5E. The layer 500 may be a unitary layer and may have a structured major surface 510 including a plurality of randomly or pseudorandomly oriented intersecting extended structures 512. In some embodiments, each structure in at least a majority (e.g., greater than 50%, or at least 60%, or at least 70%, or at least 80%, or at least 90%, or all or substantially all) of the structures 512 protrudes outwardly from the polymeric film 501. In the illustrated embodiment, each of the illustrated structures 512 protrudes outwardly from the polymeric film 501.

Figure 5F:
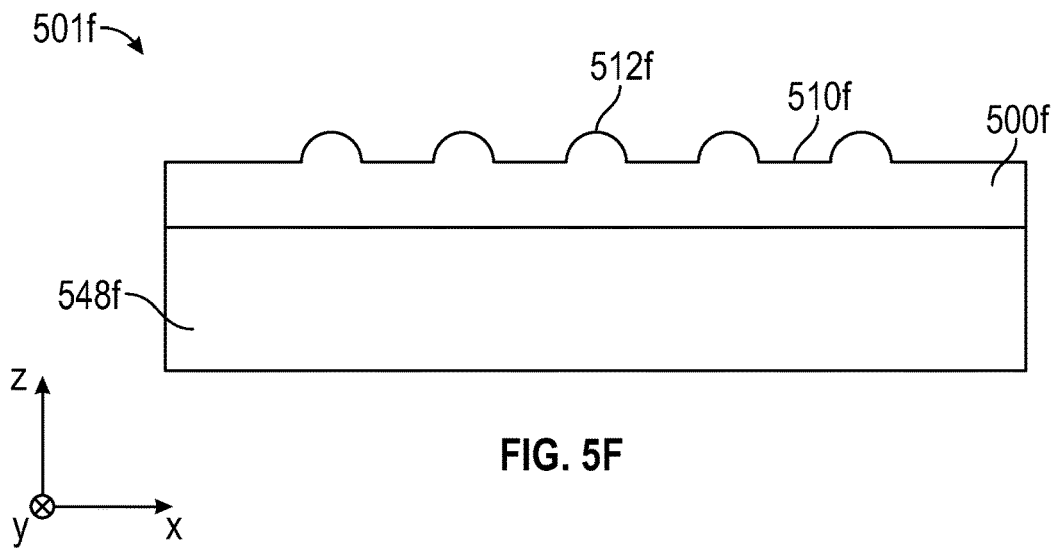
FIG. 5F is a schematic cross-sectional view of a polymeric film having a structured surface.

In some embodiments, the template layer 540 is a canvas or other suitable writing surface having a regular arrangement of fibers. In such embodiments, the resulting polymeric film may appear as schematically illustrated in FIG. 5F where the polymeric film 501$f$ includes a unitary layer 500$f$ on a substrate 548$f$, and the unitary layer 500$f$ has a major surface 510$f$ having a regular arrangement of extended structures 512$f$. The extended structures 512$f$ may be disposed in a regular pattern such as a periodic pattern along the x- and y-axes, for example. In some cases, it is preferred that the extended structured be randomly or pseudorandomly oriented in order to provide a haptic response more closely resembling that of writing on ordinary paper, for example.

Figure 6A:
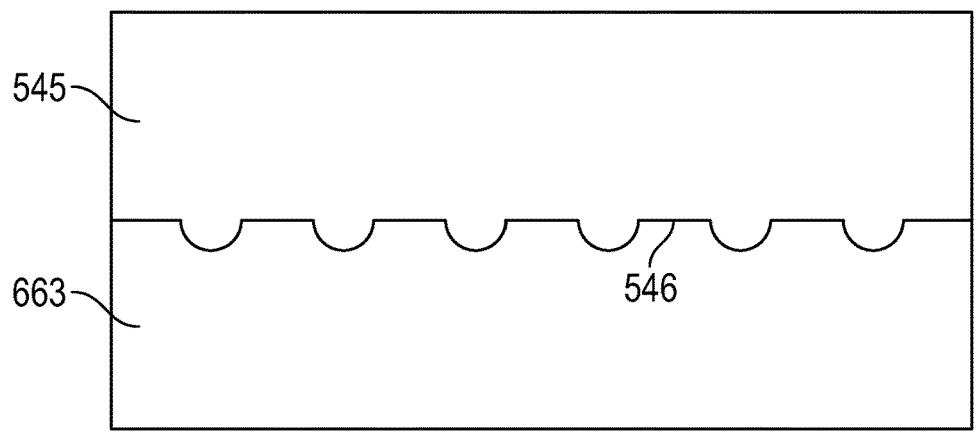
FIG. 6A is a schematic cross-sectional view of a mold resin disposed on the structured surface of the mold of FIG. 5C.
Figure 6B:
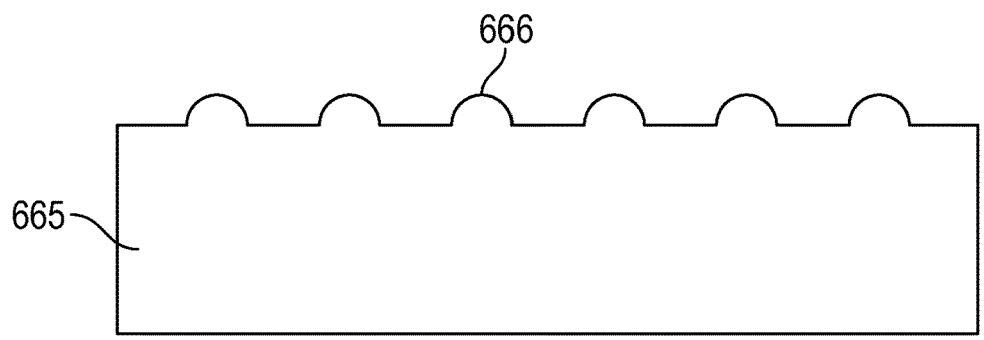
FIG. 6B is a schematic cross-sectional view of a mold formed using the mold of FIG. 5C.
Figure 6C:
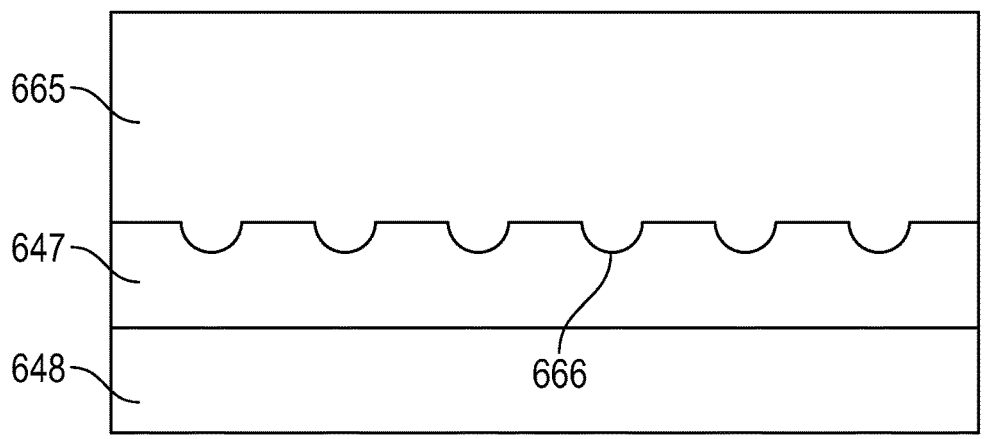
FIG. 6C is a schematic cross-sectional view illustrating a resin supported by a substrate and disposed on the structured surface of the mold of FIG. 6B.
Figure 6D:
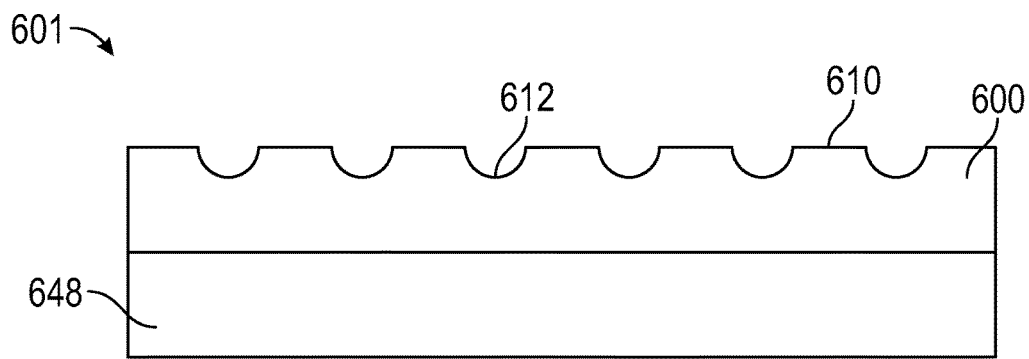
FIG. 6D is a schematic cross-sectional view of a polymeric film having a structured surface formed using the mold of FIG. 6B.

In some embodiments, a second mold is formed from the first mold 545 and the second mold is used to make the structured polymeric film as schematically illustrated in FIGS. 6A-6D. FIG. 6A is a schematic illustration of a mold resin 663 disposed on the structured surface 546 of the first mold 545. The mold resin 663 can be cast and cured against the structured surface 546 to provide a second mold 665 having a structured surface 666 as schematically illustrated in FIG. 6B. FIG. 6C is a schematic illustration showing a resin 647 that has been cast against the structured surface 666 of the second mold 665. The resin 647 is supported by substrate 648. Curing the resin 647 and removing the resin and substrate from the second mold 645 results in polymeric film 601 including layer 600 disposed on the substrate 648 as schematically illustrated in FIG. 6D. The layer 600 may be a unitary layer and may have a structured major surface 610 including a plurality of randomly or pseudorandomly oriented intersecting extended structures 612. In some embodiments, each structure in at least a majority (e.g., greater than 50%, or at least 60%, or at least 70%, or at least 80%, or at least 90%, or all or substantially all) of the structures 612 is recessed into the polymeric film 601. In the illustrated embodiment, each of the illustrated structures 612 is recessed into the polymeric film 601.

Suitable materials for the impression material, the mold resin, and the resin forming the structured surface of the polymeric film include thermally-curable resins or radiation-curable resins such as UV-curable resins. Suitable UV-curable resins include acrylates. Suitable materials for the impression material include polyethers or vinyl polysiloxanes such as the VPS impression materials available from 3M Company, St. Paul, MN Impression materials may be a paste or a putty which can be applied to a paper so that the fiber structure of the paper is imprinted in the paste or putty which is hardened while in contact with the paper that is then removed from the hardened impression material.

In some embodiments, the template layer 540 is a paper including randomly oriented fibers (e.g., pulp fibers) so that the resulting structures are a plurality of randomly or pseudorandomly oriented intersecting extended structures. In other embodiments, the template layer 540 may have an ordered fiber orientation (e.g., the template layer 540 may be a canvas, or a paper with a surface textured to mimic canvas (e.g., canvas paper)) so that the resulting structures are a plurality of intersecting extended structures that are disposed in a regular pattern.

Figure 7A:
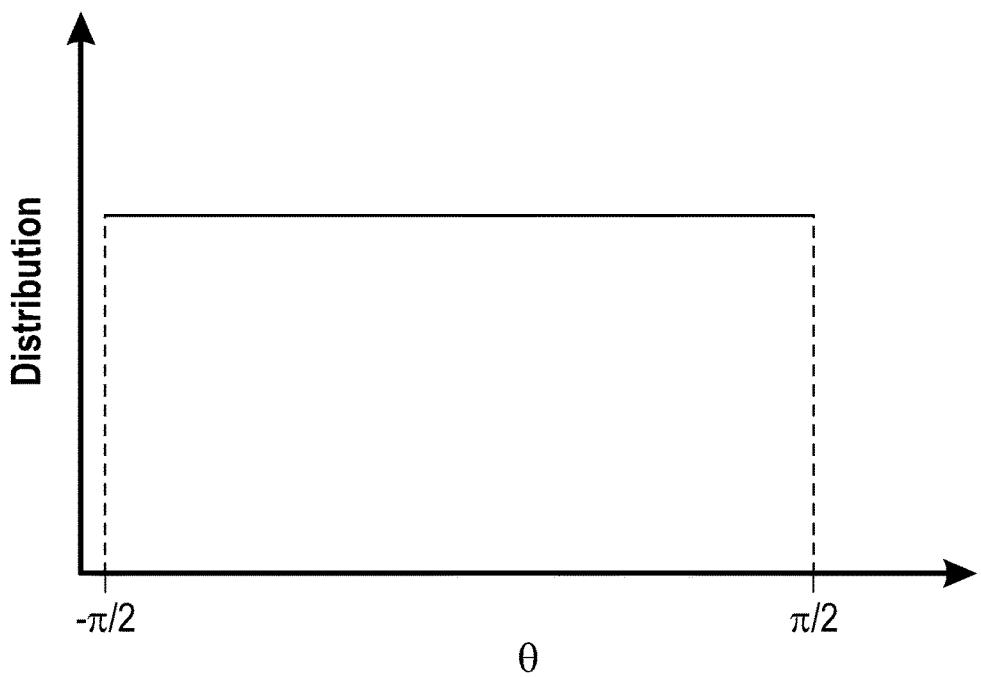
FIGS. 7A-7C are schematic illustrations of distributions of orientations of extended structures.
Figure 7B:
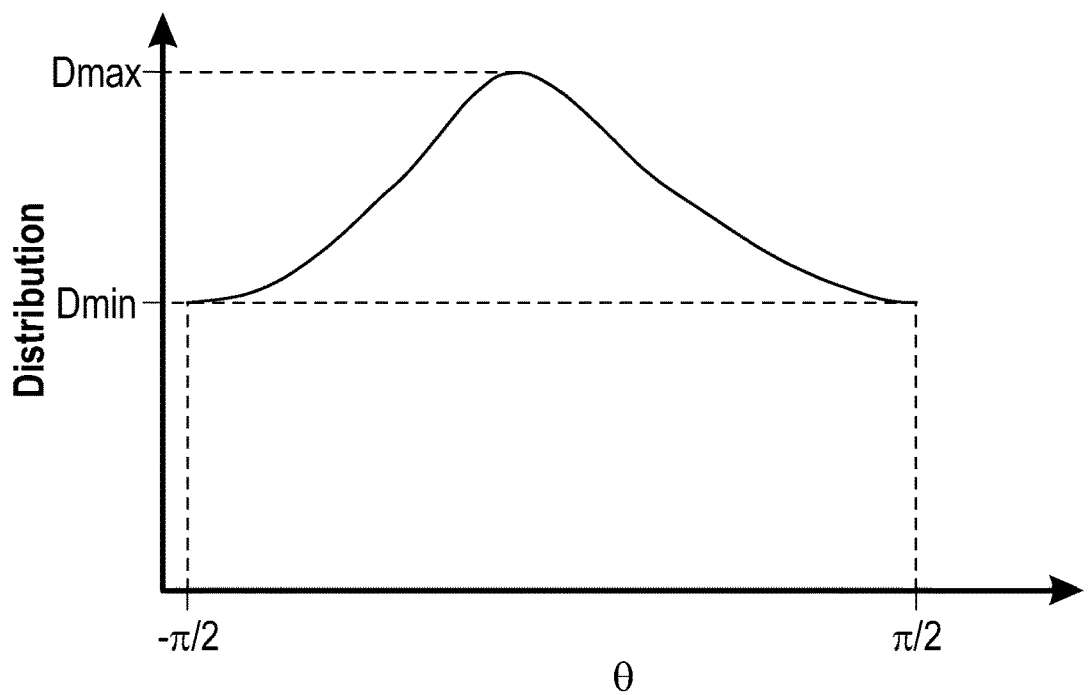
Figure 7C:
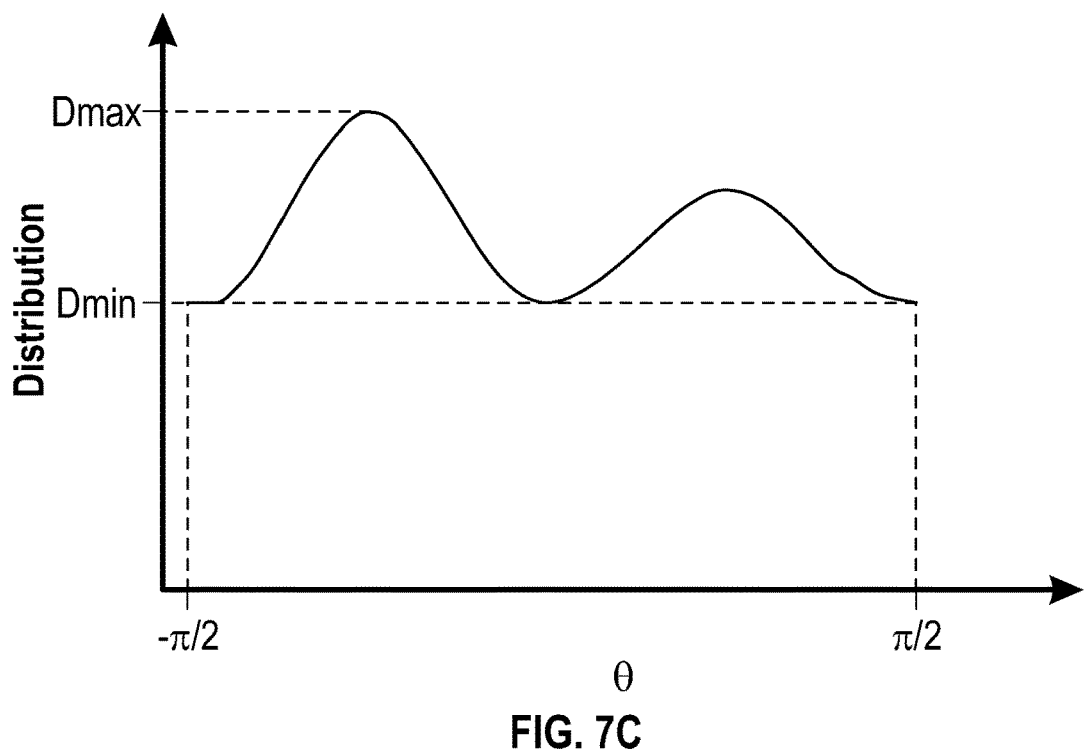

The randomness of the orientation of the extended structures can be characterized in terms of a distribution of fiber angle θ relative to a fixed direction. For example, in FIG. 1, a structure having a local orientation 113$a$ at an angle θa relative to the y-axis is illustrated, and another structure having a local orientation 113b at an angle θb relative to the y-axis is illustrated. The local orientations 113a and 113b refer to the projection of a centerline along the length of the structure at the respective location onto the plane defined by the first major surface 110 (the x-y plane in FIG. 1). A distribution of orientation can be determined by measuring the angle θ of the structures in a sufficiently large region (e.g., at least 10 or 100 times the average width in each direction, or an area of at least 10 or 100 times the inverse of the average number of structures per unit area) and determining the distribution of θ in the region. For example, the distribution can be determined by binning measured values of θ into 10 degree bins, for example, where θ is measured for each segment of each structure in the region where the segment has a length about equal to the average width of the structure, for example. FIGS. 7A-7C schematically illustrate possible distributions of randomly oriented structures. The distributions are from −π/2 to π/2 radians (−90 to 90 degrees) since an orientation at an angle of θ can be considered to be equivalent to an orientation at an angle of θ-γ. The angle θb is positive and θa is negative. In FIG. 7A, the distribution is a uniform random distribution. In FIG. 7B, the distribution is a biased random distribution with a bias along the fixed direction (θ near zero). This fixed direction may correspond to a machine direction or a transverse direction or a direction between the machine and transverse directions in the manufacturing of a paper used as a template for the structures, for example. In FIG. 7C, the distribution is a biased random distribution with a stronger bias along one direction (e.g., θ near minus 45 degrees) and a weaker bias along another direction (e.g., θ near plus 45 degrees). The two bias directions may correspond to a machine direction and a transverse direction, for example.

In some embodiments, a distribution of orientation of the structures has a maximum Dmax and a minimum Dmin. In some embodiments, the orientation of the structures is substantially uniformly randomly distributed such that Dmin is not less than 0.2 Dmax. In some embodiments, Dmax≥Dmin≥0.3 Dmax. In some embodiments, Dmin≥0.4 Dmax, or Dmin≥0.4 Dmax, or Dmin≥0.6 Dmax.

In other embodiments, the plurality of intersecting extended structures that are disposed in a regular pattern. In some embodiments, the distribution of orientation may include two sharp peaks corresponding to two weave directions (warp and weft) of a canvas, for example. In this case or in other embodiments, Dmax may be at least 10 or at least 100 times Dmin. In some embodiments, there are no fibers along a direction about halfway between the two wave directions so that Dmin is zero.

The following is a list of illustrative embodiments.

A first embodiment is a polymeric film comprising a microreplicated first major surface, the first major surface comprising a plurality of randomly or pseudorandomly oriented intersecting extended structures, wherein for at least a majority of the structures in the plurality of extended structures:
each structure extends along a length of the structure, has an average width along a direction transverse to the length and generally along the first major surface, and has an average height along a direction generally perpendicular to the first major surface; and the average width of the structure is in a range of 1 to 200 micrometers, the average height of the structure is in a range of 1 to 200 micrometers, and the length is at least 3 times the average width.

A second embodiment is the polymeric film of the first embodiment, wherein the average width divided by the average height is in a range of 0.02 to 100, or 0.2 to 10, or 0.5 to 8, or 0.7 to 6, or 0.8 to 4, or 1 to 4, or 1.5 to 4.

A third embodiment is the polymeric film of the first or second embodiment, wherein the length is at least 5, or at least 7, or at least 10, or at least 15, or at least 20 times the average width.

A fourth embodiment is the polymeric film of any one of the first through third embodiments, wherein the length is at least 3, or at least 5, or at least 7, or at least 10, or at least 15, or at least 20 times the average height.

A fifth embodiment is the polymeric film of any one of the first through fourth embodiments, wherein the plurality of extended structures covers at least 10%, or 20%, or 30%, or 40%, or 50% of a total area of the first major surface.

A sixth embodiment is the polymeric film of any one of the first through fifth embodiments, wherein each structure in at least the majority of the structures is free of fibers.

A seventh embodiment is the polymeric film of any one of the first through sixth embodiments, wherein each structure in at least the majority of the structures has a substantially hemispheric shape in a transverse cross-section.

An eighth embodiments is a polymeric film comprising a unitary layer having a structured first major surface comprising a plurality of randomly or pseudorandomly oriented intersecting extended structures protruding outwardly from the polymeric film, wherein for at least a majority of the structures in the plurality of extended structures:
each structure extends along a length of the structure, has an average width along a direction transverse to the length and generally along the first major surface, and has an average height along a direction generally perpendicular to the first major surface; and the average width of the structure is in a range of 1 to 200 micrometers, the average height of the structure is in a range of 1 to 200 micrometers, and the length is at least 3 times the average width.

A ninth embodiment is a polymeric film comprising a microreplicated first major surface, the first major surface comprising a plurality of randomly or pseudorandomly oriented intersecting extended structures, wherein for at least a majority of the structures in the plurality of extended structures: each structure extends along a length of the structure and has a largest lateral dimension orthogonal to the length, the length being at least 3 times the largest lateral dimension.

A tenth embodiment is the polymeric film of the ninth embodiment, wherein for at least the majority of the structures in the plurality of extended structures: each structure has an average width along a direction transverse to the length of the structure and generally along the first major surface, and has an average height along a direction generally perpendicular to the first major surface, the average width and the average height each being in a range of 1 to 200 micrometers.

An eleventh embodiment is the polymeric film of any one of the first through tenth embodiments, wherein the first major surface is formed by microreplicating a surface of a paper.

A twelfth embodiment is a display comprising the polymeric film of any one of the first through eleventh embodiments disposed on an output surface of the display, the first major surface of the polymeric film facing away from the output surface of the display.

A thirteenth embodiment is a method of making a polymeric film, the method comprising: forming a first mold by coating a template layer with an impression material, at least partially curing the impression material, removing the template layer from the at least partially cured impression material to provide the first mold having a structured surface; and casting and curing a resin against the structured surface of the first mold or against a structured surface of a second mold formed from the first mold, wherein the template layer is a paper or a canvas.

A fourteenth embodiment is a display comprising a polymeric film disposed on an output surface of the display, the polymeric film having a first major surface, the first major surface comprising a plurality of intersecting randomly or pseudorandomly oriented extended structures, wherein for at least a majority of the structures in the plurality of intersecting extended structures: each structure extends along a length of the structure and has a largest lateral dimension orthogonal to the length, the length being at least 3 times the largest lateral dimension, wherein the plurality of extended structures covers at least 10%, or 20%, or 30%, or 40%, or 50% of a total area first major surface.

A fifteenth embodiment is a display comprising a polymeric film disposed on an output surface of the display, the display being configured to be electronically writable with a stylus, the polymeric film having a first major surface formed by microreplicating a surface of a paper or a canvas and configured to provide a haptic response through the stylus, the first major surface comprising a plurality of intersecting extended structures, wherein for at least a majority of the structures in the plurality of intersecting extended structures: each structure extends along a length of the structure and has a largest lateral dimension orthogonal to the length, the length being at least 3 times the largest lateral dimension, wherein the plurality of extended structures covers at least 10%, or 20%, or 30%, or 40%, or 50% of a total area first major surface.

EXAMPLES

Materials

| Tradename or Abbreviation | Description |
|---|---|
| P1 | Staples Copy Paper C 92 bright (available from Staples, Framingham, MA) |
| MM1 | Imprint II VPS impression material, commercially available from 3M Company, St. Paul, MN |
| R1 | Polymerizable resin composition having a refractive index 1.57 prepared by mixing CN-120, PEA, DAROCUR 1173, TPO at a weight ratio of 75/25/0.25/0.1 |
| PET | 5 mil (127 micrometers), 1 side primed PET film, commercially available from Tekra, New Berlin, WI |
| TPO | 2,4,6-trimethylbenzoyl-diphenyl-phosphineoxide available from Sigma-Aldrich Chemical Company, Milwaukee, WI |
| CN-120 | Epoxy acrylate available from Sartomer Americas, Exton, PA |
| PEA | Phenoxyethyl acrylate available from Sigma-Aldrich Chemical Company, Milwaukee, WI |
| DAROCUR 1173 | Photoinitiator available from BASF, Ludwigshafen, Germany |

Example 1

A film was prepared by microreplicating a surface of a paper using a molding process. The paper P1 was taped down to a flat piece of standard float glass. MM1 impression material was dispensed over the top of P1 at approximately 3-5 mm thick. Once P1 was completely covered, the MM1 material was allowed to cure for 1 hour at room temperature. After 1 hour, P1 was removed by peeling from MM1. At this point, MM1 had the negative of the structure of the paper. The MM1 material was then taped down to a piece of standard float glass. The resin R1 was spread over the top of MM1 completely covering the structure. The resin R1 has an approximately 25 micrometer thickness. Then the primed PET film was laid over the top of the uncured resin with the primed side in contact with the uncured R1. A UV light source (Clearstone Technologies' CF2000 using 385 nm wavelength LED, available from Clearstone Technologies Inc., Hopkins, MN) was turned on and held over the top of the sample and cured at 100% intensity for 1 min. After the cure time was over, MM1 was removed from the resulting film. An image of the resulting structured surface of the film is provided in FIG. 9.

The dielectric constant of the film was measured at 500 kHz using a Novocontrol Alpha Model Dielectric Spectrometer, made by Novocontrol Company from Germany according to ASTM D150-18 and determined to be 2.83.

The length, width and height of several fibers in the replicated film with a Keyence VHX-600 (Osaka, Japan) The results are provided in the following table.

| Fiber | Width (μm) | Length (μm) | Height (μm) | Length/width | Width/Height |
|---|---|---|---|---|---|
| 1 | 12.9 | 647 | 7 | 49.9 | 1.8 |
| 2 | 11.9 | 480 | 6 | 40.5 | 2.0 |
| 3 | 25 | 806 | 7 | 32.2 | 3.6 |

A user study was performed to rate four samples on how close they felt to paper. Samples were lamented to the front surface of a Microsoft Surface Pro (Microsoft Corp. Redmond, WA). A two mil adhesive (8146-2, available from 3M Company, St. Paul MN) was lamented to the back of the samples. The samples were laminated to the front surface of the display. The following samples were tested:

Sample 1: Paper (P1)
Sample 2: The microreplicted film produced in Example 1
Sample 3: An antiglare film (3M Anti-Glare Screen Protector for APPLE IPHONE 5/5S/5C/SE NVAG828762, available from 3M Company, St. Paul MN)
Sample 4: No sample, bare screen of the Microsoft surface Pro 13 People were chosen at random to feel all four samples with their fingers. They were asked to rate the samples as follows:

1. Feels like paper
2. Has texture but does not feel like paper
3. Does not feel like paper No cleaning or hand washing or any prep of the participants was used. They were randomly asked at a random part of the day to stop what they were doing and feel the samples. The results are shown in the following table.

| | Sample | | | |
|---|---|---|---|---|
| Person | 1 | 2 | 3 | 4 |
| 1 | 1 | 1 | 3 | 3 |
| 2 | 1 | 1 | 2 | 3 |
| 3 | 1 | 2 | 3 | 3 |
| 4 | 1 | 2 | 3 | 3 |
| 5 | 1 | 1 | 3 | 3 |
| 6 | 1 | 1 | 3 | 3 |
| 7 | 1 | 2 | 3 | 3 |
| 8 | 1 | 1 | 3 | 3 |
| 9 | 1 | 1 | 2 | 3 |

-continued

|        | Sample |     |     |     |
|--------|--------|-----|-----|-----|
| Person | 1      | 2   | 3   | 4   |
| 10     | 1      | 1   | 3   | 3   |
| 11     | 1      | 2   | 3   | 3   |
| 12     | 1      | 1   | 2   | 3   |
| 13     | 1      | 1   | 2   | 3   |
| Average| 1.0    | 1.3 | 2.7 | 3.0 |

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A polymeric film comprising a microreplicated first major surface, the first major surface comprising a plurality of randomly or pseudorandomly oriented intersecting extended structures, wherein for at least a majority of the structures in the plurality of extended structures:
    each structure extends along a length of the structure, has an average width along a direction transverse to the length and generally along the first major surface, and has an average height along a direction generally perpendicular to the first major surface; and
    the average width of the structure is in a range of 1 to 200 micrometers, the average height of the structure is in a range of 1 to 200 micrometers, and the length is at least 3 times the average width,
    wherein a distribution of orientation of the structures as a function of an angle of orientation of the structures is constant or has minimum and maximum values such that the minimum value is not less than 0.2 times the maximum value.

2. The polymeric film of claim 1, wherein the average width divided by the average height is in a range of 0.2 to 10.

3. The polymeric film of claim 1, wherein the length is at least 7 times the average width.

4. The polymeric film of claim 1, wherein the length is at least 7 times the average height.

5. The polymeric film of claim 1, wherein the plurality of extended structures covers at least 20% of a total area of the first major surface.

6. The polymeric film of claim 1, wherein each structure in at least the majority of the structures is free of fibers.

7. The polymeric film of claim 1, wherein each structure in at least the majority of the structures has a substantially hemispheric shape in a transverse cross-section.

8. A polymeric film comprising a unitary layer having a structured first major surface comprising a plurality of randomly or pseudorandomly oriented intersecting extended structures protruding outwardly from the polymeric film, wherein for at least a majority of the structures in the plurality of extended structures:
    each structure extends along a length of the structure, has an average width along a direction transverse to the length and generally along the first major surface, and has an average height along a direction generally perpendicular to the first major surface; and
    the average width of the structure is in a range of 1 to 200 micrometers, the average height of the structure is in a range of 1 to 200 micrometers, and the length is at least 3 times the average width,
    wherein a distribution of orientation of the structures as a function of an angle of orientation of the structures is constant or has minimum and maximum values such that the minimum value is not less than 0.2 times the maximum value.

9. A polymeric film comprising a microreplicated first major surface, the first major surface comprising a plurality of randomly or pseudorandomly oriented intersecting extended structures, wherein for at least a majority of the structures in the plurality of extended structures: each structure extends along a length of the structure and has a largest lateral dimension orthogonal to the length, the length being at least 3 times the largest lateral dimension,
    wherein a distribution of orientation of the structures as a function of an angle of orientation of the structures is constant or has minimum and maximum values such that the minimum value is not less than 0.2 times the maximum value.

10. The polymeric film of claim 9, wherein for at least the majority of the structures in the plurality of extended structures: each structure has an average width along a direction transverse to the length of the structure and generally along the first major surface, and has an average height along a direction generally perpendicular to the first major surface, the average width and the average height each being in a range of 1 to 200 micrometers.

11. The polymeric film of claim 1, wherein the first major surface is formed by microreplicating a surface of a paper.

12. A display comprising the polymeric film of claim 1 disposed on an output surface of the display, the first major surface of the polymeric film facing away from the output surface of the display.

13. A method of making the polymeric film of claim 1, the method comprising:
    forming a first mold by coating a template layer with an impression material, at least partially curing the impression material, removing the template layer from the at least partially cured impression material to provide the first mold having a structured surface; and
    forming the microreplicated first major surface by casting and curing a resin against the structured surface of the first mold or against a structured surface of a second mold formed from the first mold, wherein the template layer is a paper or a canvas.

14. A display comprising the polymeric film of claim 1 disposed on an output surface of the display, the display being configured to be electronically writable with a stylus, the first major surface being formed by microreplicating a surface of a paper or a canvas and being configured to provide a haptic response through the stylus, wherein the plurality of extended structures covers at least 20% of a total area first major surface.

15. The display of claim 14, wherein each structure in at least the majority of the structures has a substantially hemispheric shape in a transverse cross-section.

16. The display of claim 14, wherein a distribution of orientation of the structures as a function of an angle of orientation of the structures is constant or has minimum and maximum values such that the minimum value is not less than 0.2 times the maximum value.

* * * * *